(12) United States Patent
Shoji et al.

(10) Patent No.: US 6,985,426 B2
(45) Date of Patent: Jan. 10, 2006

(54) METHOD AND APPARATUS FOR RECORDING OPTICAL INFORMATION INCLUDING DUMMY DATA, AND OPTICAL DISK HAVING SUCH DATA RECORDED THEREON

(75) Inventors: Mamoru Shoji, Sakai (JP); Atsushi Nakamura, Kadoma (JP); Takashi Ishida, Yahata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 478 days.

(21) Appl. No.: 10/078,699

(22) Filed: Feb. 21, 2002

(65) Prior Publication Data

US 2002/0118624 A1 Aug. 29, 2002

(30) Foreign Application Priority Data

Feb. 23, 2001 (JP) ........................ 2001-047855

(51) Int. Cl.
*G11B 7/007* (2006.01)

(52) U.S. Cl. .................... 369/275.3; 369/47.28; 369/47.3

(58) Field of Classification Search ............. 369/275.3, 369/59.25, 47.3, 47.28
See application file for complete search history.

(56) References Cited

U.S. PATENT DOCUMENTS

| 5,138,599 | A | * | 8/1992 | Fukushima et al. ....... 369/30.13 |
| 5,850,382 | A | * | 12/1998 | Koishi et al. ............. 369/275.3 |
| 5,878,020 | A | * | 3/1999 | Takahashi ................ 369/59.25 |
| 5,923,640 | A | * | 7/1999 | Takemura et al. ........ 369/275.3 |
| 5,966,358 | A | * | 10/1999 | Mine ....................... 369/47.14 |
| 6,252,838 | B1 | * | 6/2001 | Kuroda et al. ........... 369/47.28 |
| 6,269,059 | B1 | * | 7/2001 | Kuroda et al. ........... 369/47.28 |

FOREIGN PATENT DOCUMENTS

JP 11-504461 4/1999
WO 97/30439 8/1997

* cited by examiner

*Primary Examiner*—William Klimowicz
*Assistant Examiner*—Michael V. Battaglia
(74) *Attorney, Agent, or Firm*—Wenderoth, Lind, & Ponack, L.L.P.

(57) ABSTRACT

A method of recording data optically to an optical disk having a plurality of sectors, in which each sector has a region to be recorded with data, the data is recorded in units of blocks, and the block includes a predetermined number of sectors and is a data unit including error correction codes. In recording data related to a content by dividing and recording the data in a plurality of sectors continuously, dummy data to be used for extracting a clock in PLL for data reproduction is recorded on a region adjacent before a sector from which data recording is started. The data related to the contents is recorded on sectors following the region recorded with the dummy data.

6 Claims, 10 Drawing Sheets

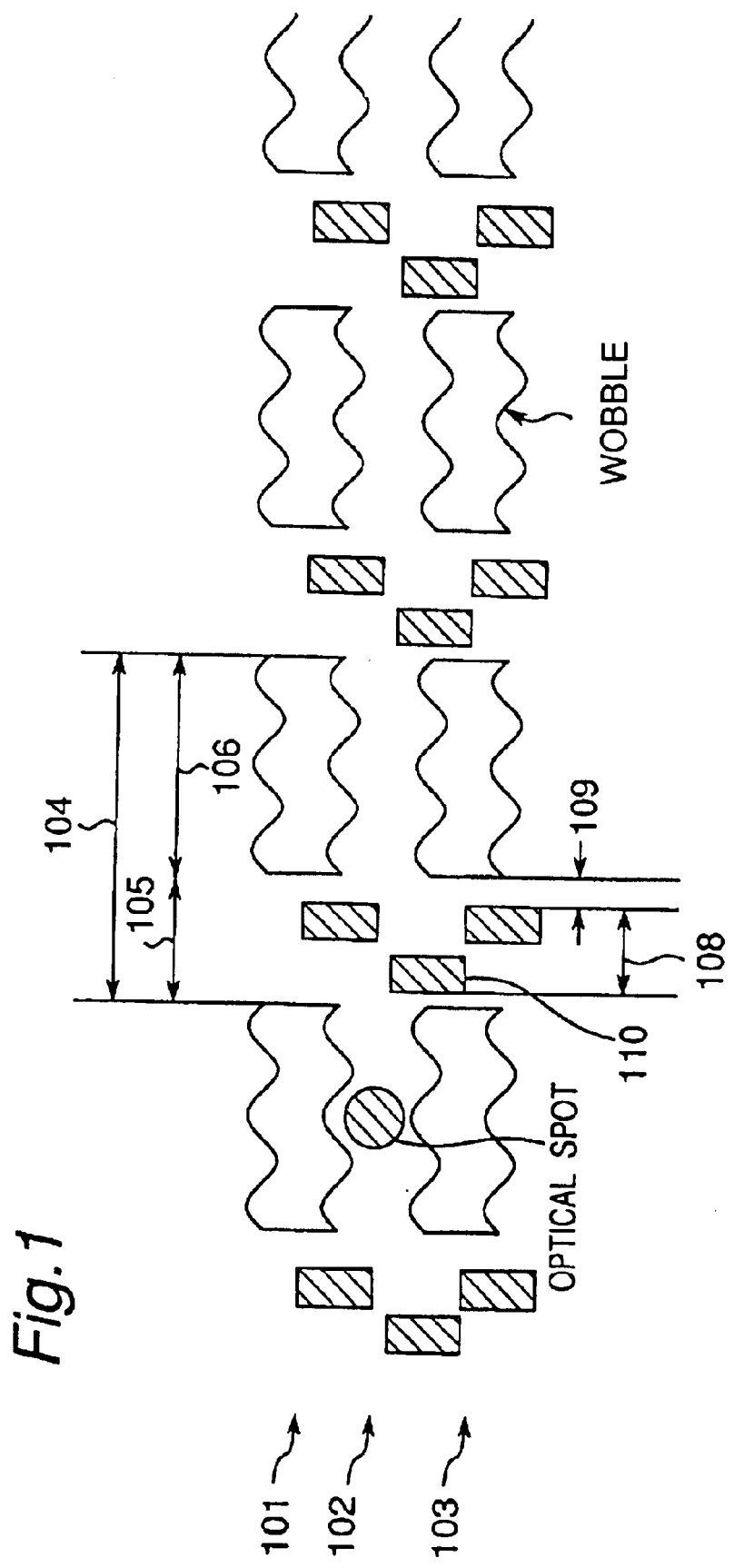

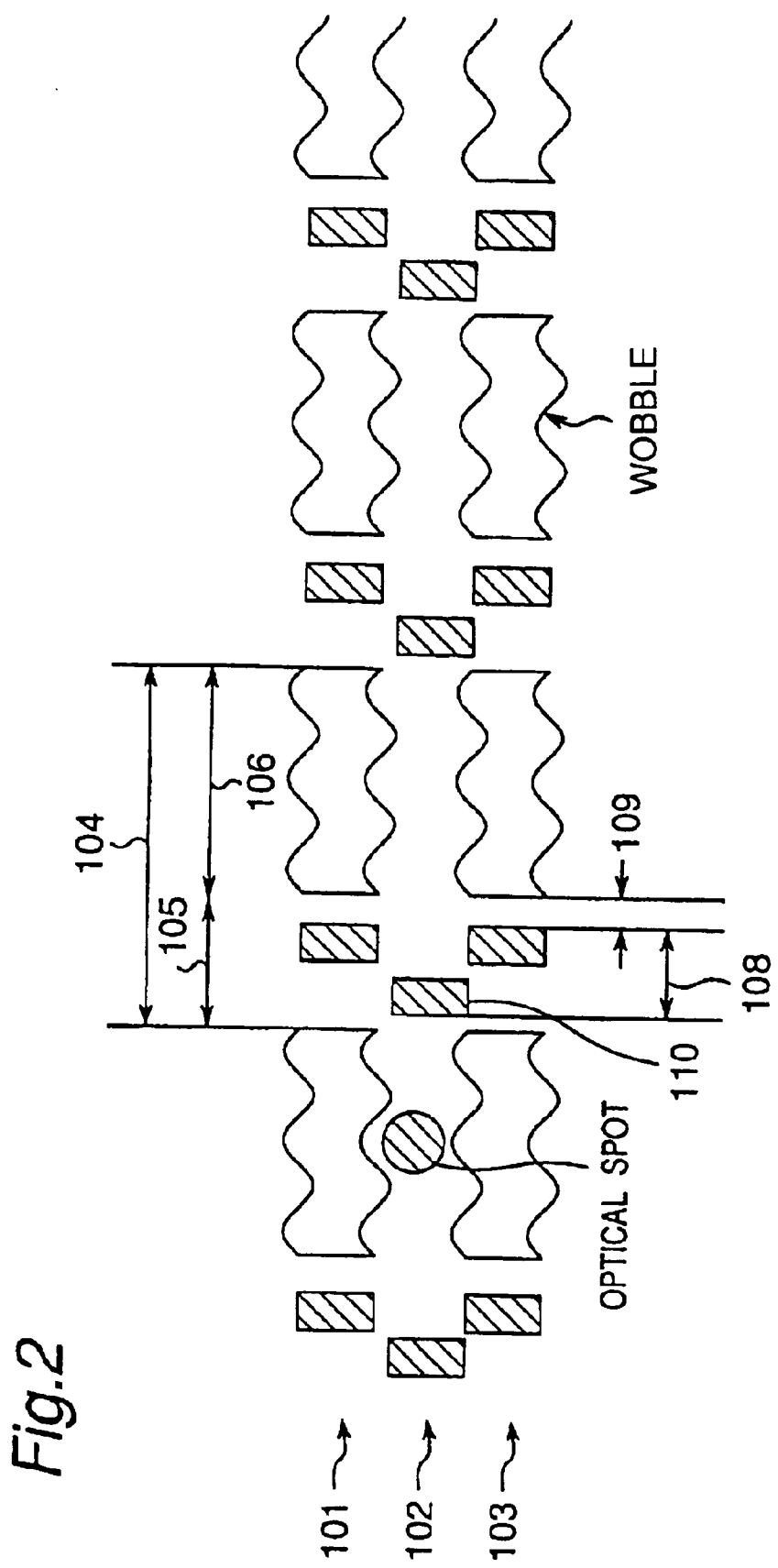

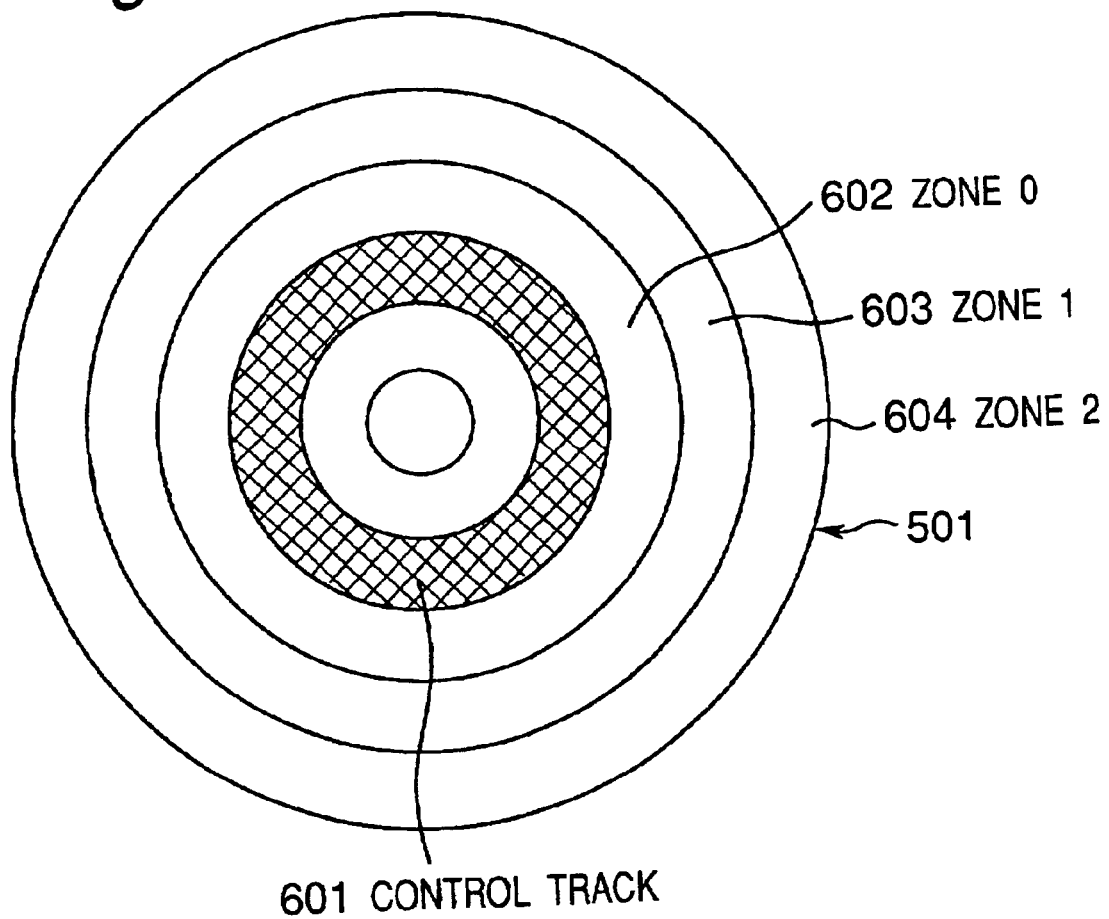

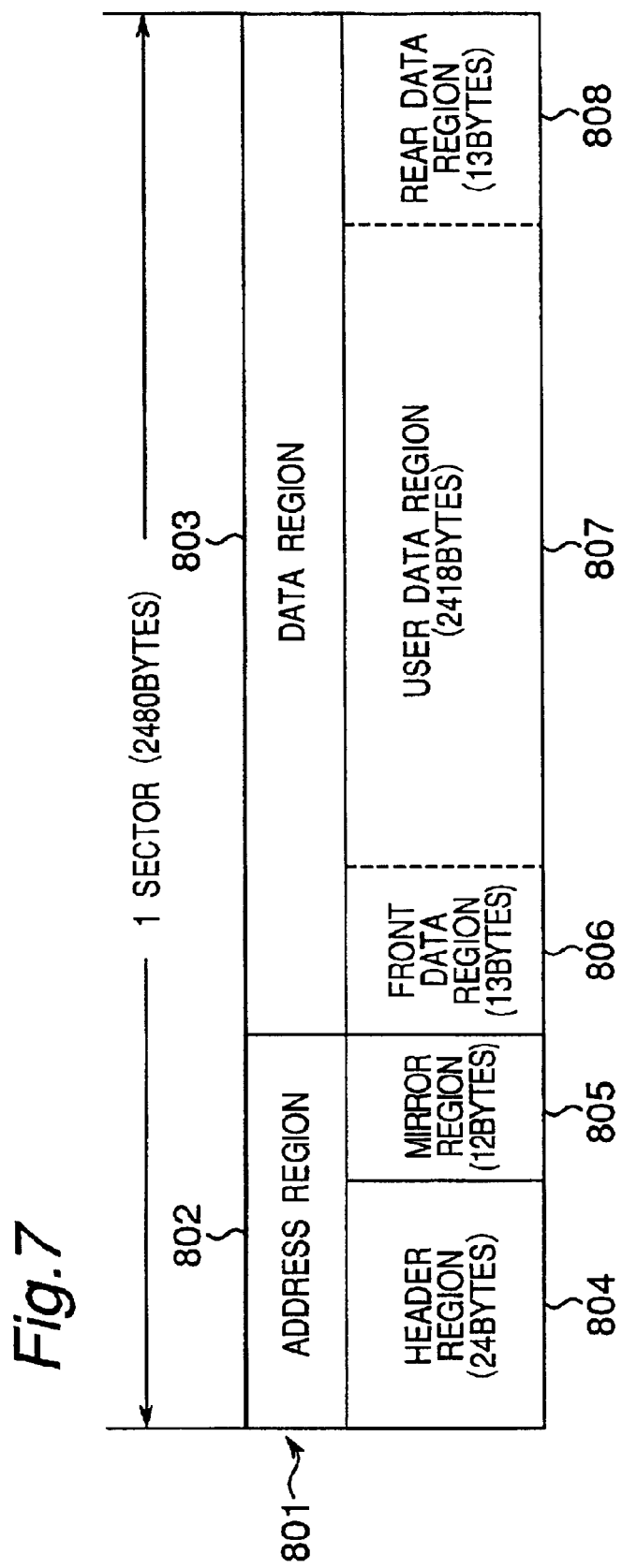

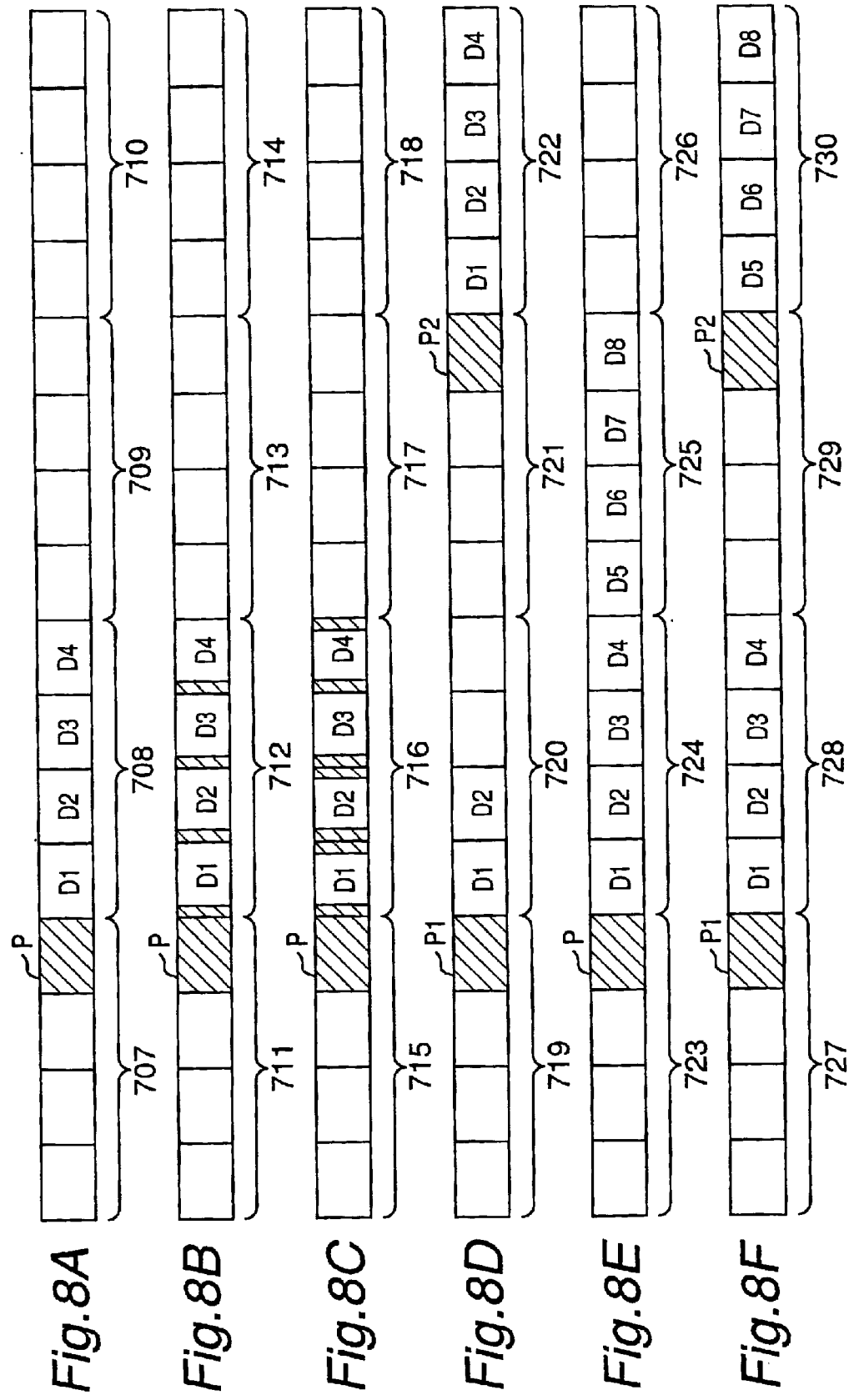

METHOD AND APPARATUS FOR RECORDING OPTICAL INFORMATION INCLUDING DUMMY DATA, AND OPTICAL DISK HAVING SUCH DATA RECORDED THEREON

BACKGROUND OF THE INVENTION

1. Technical Field

This invention relates to a data recording method used in an apparatus for recording information onto an optical disk by emitting a laser beam to the optical disk.

2. Related Art

Recently, optical disks have become highly desired to be used for visual application, and thus it is desired that optical disks be capable of mass storage and be able to be accessed at a high speed. For this purpose, there needs to develop an art capable of recording more microscopic information. Further, it is important to reduce an overhead region which is a portion that does not directly contribute to the capacity such as an address region.

FIG. 10 is a view illustrating a physical sector structure on a track of a conventional optical disk. As shown in FIG. 10, the optical disk has a sector 901 which includes an address region 902 indicating address information and a data region 903 to/from which information can be recorded/reproduced. The data region 903 is located in both a groove track 904 and a land track 905 between the groove tracks. The address region 902 includes a header region 906 and a mirror region 907. The header region 906 is used to record concavo-convex pits which are produced when the optical disk is manufactured, and can not be re-written.

FIG. 11 shows a sector format. As described above, the sector includes the address region 902 and the data region 903. The address region 902 includes a header region 906 of 128 bytes and a mirror region 907 of 2 bytes. The data region 903 includes 2418 bytes of user data region 1007 used to record user data, 68 bytes of clock extraction region 1006, and 81 bytes of buffer region 1008. The clock extraction region 1006 is used for a PLL (Phase Locked Loop: to generate a clock with frequency and phase locked to an input signal) to input the signal for extracting the clock at data reproduction, and is used to absorb a deterioration of a front portion caused by iterative data recording. The buffer region 1008 is used to absorb a position shift at data recording or a deterioration of an end portion caused by repeated data recording.

To record 2418 bytes of data in the user data region of one sector, the above described optical disk needs 128 bytes of header region, 2 bytes of the minor region, 68 bytes of clock extraction region, and 81 bytes of buffer region. Accordingly, 2697 bytes length in total is needed for a sector. The data portion includes a portion for error correction, and therefore a sector needs 2697 bytes length to store 2048 bytes of data. At that time, a utilization ratio of the disk (format efficiency) for recording a signal on the disk is 75.9% (=2048/2697). This means that the format includes 24.1% of redundancy.

For example, in order to record 4.7 GB of data, more data has to be recorded on a unit area with 75.9% of format efficiency than that needed in the recording with 100% of format efficiency. The quality of reproduction signal with 75.9% of format efficiency deteriorates less than that with 100% of format efficiency. To reduce the redundancy, there is a method to reduce a length of the clock extraction region 1006 in the data region. However, this method causes a problem that it becomes difficult to extract the clock used for data reproduction operation in PLL in a front portion of a series of data.

SUMMARY OF THE INVENTION

The present invention is directed to solve the above described problem. It is an object of the invention to provide a data recording method and apparatus capable of providing a stable operation of PLL which generates a phase-locked clock, even though a region from which PLL inputs a signal used to lock phase and frequency of the clock is reduced for improvement of a disk utilization ratio in recording signal (data) on the optical disk.

In a first aspect of the invention, provided is a method of recording data optically onto an optical disk. The optical disk has a plurality of sectors, each sector having a data region used to record data. The data is recorded in units of blocks, the block is a data unit which includes a predetermined number of sectors and to which error correction is applied.

According to the method, in recording data related to a content by dividing and recording the data on a plurality of continuous sectors, dummy data is recorded on a region adjacent before a sector from which data recording is started, and the data related to the contents is recorded on sectors following the region recorded with the dummy data. The dummy data is used for extracting a clock for data reproduction.

The region adjacent before on which the dummy data is recorded may be a sector adjacent before the sector from which data recording is started, or a region between the blocks.

Further, the dummy data may be recorded on front and/or end portions of each sector on which the data is recorded.

Further, the dummy data may include a synchronizing pattern with a single frequency, or iteration of predetermined patterns.

Further, when a region used to record data of the optical disk is divided into a plurality of zones each having a different rotational speed of the disk at data reproduction, the region on which the dummy data is recorded may be in the vicinity of the most inside area in each zone.

Further, when the data recording is suspended during the recording of data related to the content, the dummy data may be recorded on a region adjacent before a sector from which the data recording of data related to the content is re-started.

Further, the dummy data recorded adjacent before the leading block included in the contents may be longer than the dummy data recorded adjacent before each block included in the contents.

Further, the dummy data recorded adjacent after the final block included in the contents may be longer than the dummy data recorded adjacent after each block included in the contents.

In a second aspect of the invention, provided is an apparatus for recording data optically onto an optical disk. The optical disk has a plurality of sectors. Each sector has a data region used to record data. The data is recorded in units of blocks. The block is a data unit which includes a predetermined number of sectors and to which error correction is applied.

The apparatus includes a recording unit that optically records the data onto the optical disk, and a controller that controls the recording operation of the recording unit.

In recording data related to a content by dividing and recording the data in a plurality of continuous sectors, the controller controls the recording unit such that dummy data to be used for extracting a clock for data reproduction is recorded on a region adjacent before a sector from which data recording is started, and that the data related to the contents is recorded on sectors following the region recorded with the dummy data.

In a third aspect of the invention, provided is an optical disk to record data optically, having a plurality of sectors, each sector having a data region used to record data. The data is recorded in units of blocks. The block is a data unit which includes a predetermined number of sectors and to which error correction is applied.

In recording data related to a content by dividing and recording the data on a plurality of continuous sectors, dummy data is recorded on a region adjacent before a sector from which data recording is started, the dummy data is used for extracting a clock for data reproduction. The data related to the contents is recorded on sectors following the region recorded with the dummy data.

According to the invention, recording the dummy data on the sector adjacent before the sector from which data reproduction is started allows a stable operation of extracting the clock in PLL even though the length of the clock extraction region is reduced or eliminated.

Recording the dummy data to the front portion of sector storing the data allows the clock extraction in PLL, as well as recording on the sector adjacent before the sector from which data reproduction is started, to be quickly recovered by reproducing the dummy data region, even though the clock extraction in PLL becomes unstable when the optical beam passes through the address region. Also, in iterative data recording, it is possible to absorb the deterioration of recording layer which extends from the front portion of the sector at which a deviation of the incident laser power is large.

Further, recording the dummy data on end portion of the sector storing the data allows a position shift occurred at data recording to be absorbed. Also, in iterative data recording, it is possible to absorb the deterioration of recording layer which extends from the front portion of the sector at which a deviation of the incident laser power at iterative data recording is large.

The dummy data can be a single frequency synchronizing pattern to extract the clock, thus to provide a stabler operation of extracting the clock in PLL.

BRIEF DESCRIPTION OF THE DRAWINGS

FIG. 1 is an illustrative view of a physical sector structure on a track of an optical disk according to the invention;

FIG. 2 is an illustrative view of an another physical sector structure on a track of an optical disk according to the invention;

FIG. 6 shows an optical disk in which a plurality of zones are provided;

FIG. 7 is an illustrative view of sector format in the invention;

FIGS. 8A to 8F are illustrative views showing various recording modes of recording the dummy data (First Embodiment);

DETAILED DESCRIPTION OF THE PREFERRED EMBODIMENTS

Figure 3A:
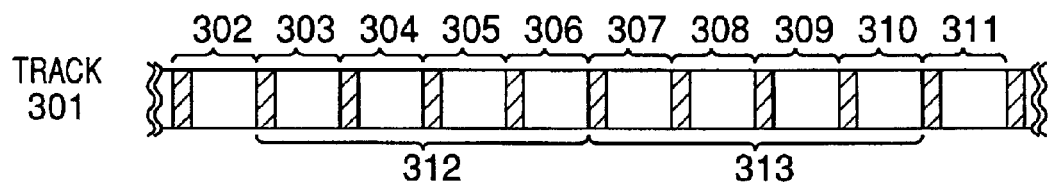
FIG. 3A is an illustrative view of a sector configuration.

The description is made to a data recording method of an optical disk in a preferred embodiments of the invention below.

First Embodiment.
<Track Configuration of Optical Disk>

FIG. 1 is a view illustrating a physical sector structure on a track of an optical disk of the invention. As shown in FIG. 1, the optical disk has a groove track 101 and 103 and a land track 102 between the groove tracks. A sector 104 which is an information unit includes an address region 105 and a data region 106. The address region 105 includes a header region 108 and a mirror region 109. The header region 108 is used to record concavo-convex pits which are produced when the optical disk is manufactured, and can not be re-written. The data region 106 is located in both a groove track 101 and a land track 102.

In FIG. 1, a group of concavo-convex pits 110 is located on a border line between the land track 102 and the groove track 101 or 103 so that the group of concavo-convex pits 110 can be detected from either of the land track 102 and the groove track 103. The arrangement of the group of concavo-convex pits 110 is not limited to this. The group of concavo-convex pits 110 may be located at a center of each track, as shown in FIG. 2. Even in this case, the address region or the data region may be located at either one of the groove track and the land track.

Figure 3B:
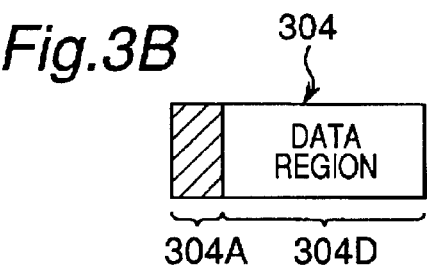
FIG. 3B is a view showing the address region and the data region.

FIGS. 3A and 3B are illustrative views of a sector configuration of the optical disk shown in FIG. 1. In FIG. 3A, the track 301 includes a plurality of sectors 302 to 311. Four sectors 303 to 306 compose one block 312. Similarly four sectors 307 to 310 compose one block 313. The "block" is a unit for data recording that includes error correction codes, and a data unit in which error correction to the data can be completed by itself. Data is recorded or reproduced in units of blocks. Each sector 302, 303, includes the address region and the data region as described above. For example, the sector 304 includes a forehand address region 304A and a following data region 304D (see FIG. 3B). Although in this embodiment address information of the sector is recorded by the concavo-convex pits 110, any other methods can be used to record the address information as long as the data region is separated by the address region.

In this embodiment, four sectors compose one block, and one block address is detected by reproducing address regions of four sectors. This configuration can reduce an address region of each sector compared to the prior art (see FIG. 7), thus to increase data storage capacity. In the data region, information is recorded as pits after modulated according to a predetermined modulation method. The pits can be formed, for example, by changing optics of a material of a recording layer in accordance with a an emitted power of the laser beam varied strongly and weakly.

As described above, in this embodiment, four sectors compose one block, and one block address is detected by reproducing address regions of all of the four sectors. The number of sectors composing one block may be any number other than four. The block address may be detected by reproducing address regions in some of all sectors composing one block.

Figure 4:
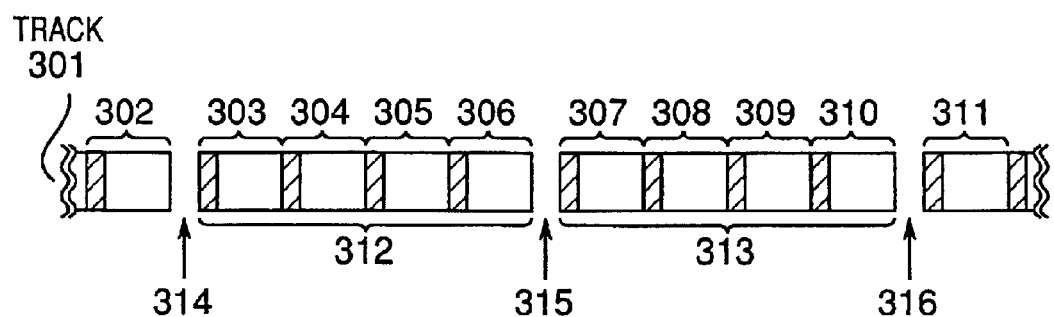
FIG. 4 is an illustrative view of a logical sector configuration in which a mirror region is provided to each block.

It is noted that it needs to recognize a leading sector in order to detect one block address by reproducing address regions of a plurality of sectors. For this purpose, as shown in FIG. 4, mirror regions 314, 315 and 316 may be provided to each block. The length of the mirror region 314, 315 or 316 shown in FIG. 4 is equal to or more than twice the length of the mirror region 109 shown in FIG. 1. By providing the long mirror region to each block as described above, in conversion of a pit train of the concavo-convex pits 110 in the address region into patterns (for example, a pit train of "concave", "convexity" and "concave" is converted into "1", a pit train of "convexity", "concave" and "convexity" is converted into "0", and a pit train of "convexity", "convexity" and "concave" is converted as "a head of block"), it becomes needless to provide a pattern to indicate a head of a sector. This allows the number of patterns to be reduced, and a reading rate indicating a probability of correctly reading patterns other than that pattern to be improved.

<Configuration of Recording Apparatus>

Figure 5:
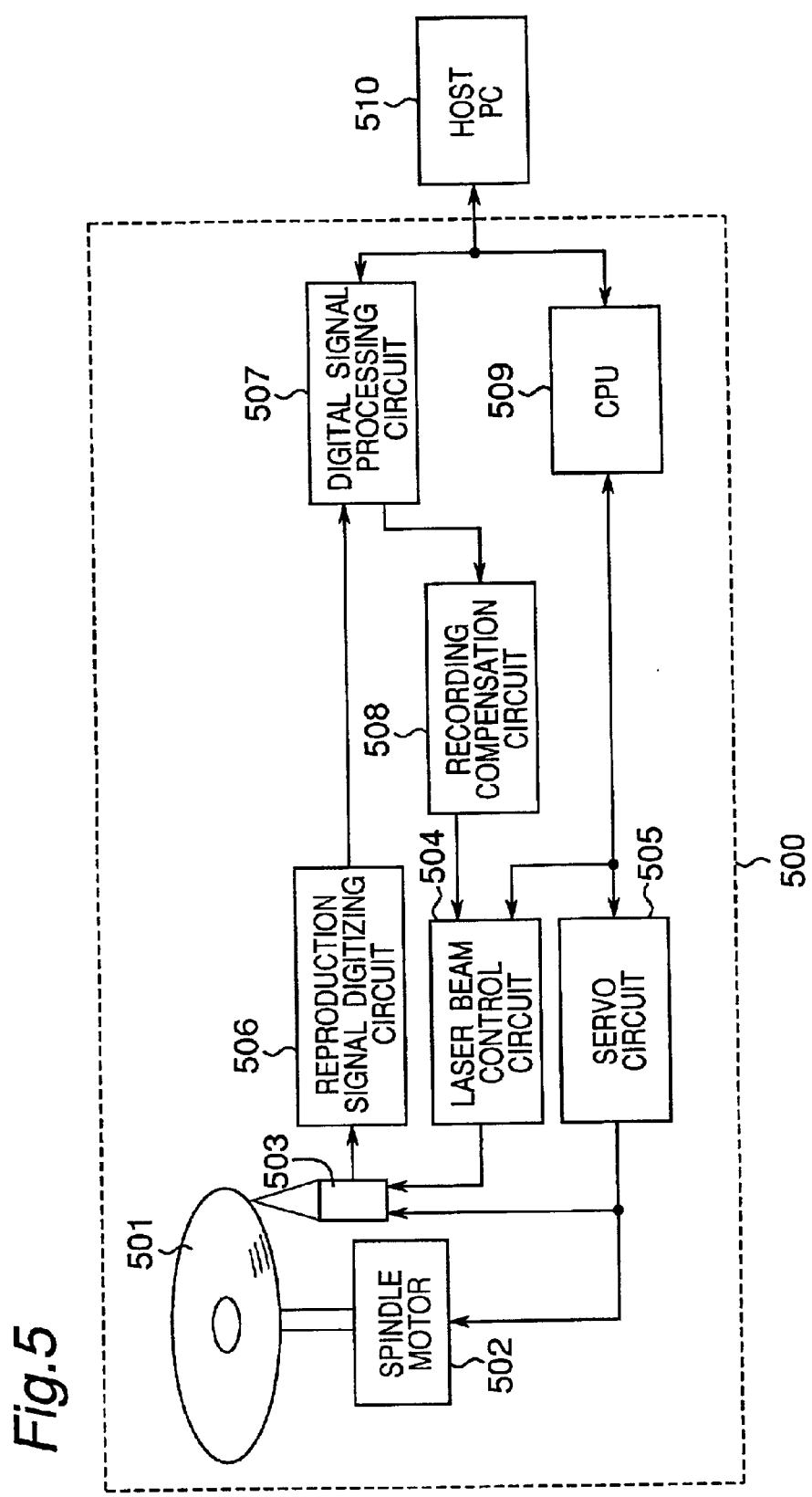
FIG. 5 is a block diagram of a recording apparatus for an optical disk according to the invention.

FIG. 5 is a block diagram of a recording apparatus (it is referred to as "an optical disk drive" below) of optical information according to the invention. The optical disk drive 500 is an apparatus for recording information onto the optical disk 501, and includes a spindle motor 502, an optical head 503, a laser beam control circuit 504, a servo circuit 505, a reproduction signal digitizing circuit 506, a digital signal processing circuit 507, a recording compensation circuit 508, and CPU 509. The optical disk drive 500 is connected to a host PC 510.

The spindle motor 502 is a motor which rotates the optical disk 501. The optical head 503 emits the laser beam onto the optical disk 501 and converts the reflected beam from the disk 501 into an electrical signal to output the signal as a reproduction signal. The beam control circuit 504 controls a power of the laser beam emitted from the optical head 503. This control is executed according to instructions from the CPU 509.

The servo circuit 505 performs position control of the optical head 503, focus and tracking control, and rotation control of the spindle motor 502. The reproduction signal digitizing circuit 506 amplifies and digitizes the reproduction signal from the optical head 503 to generate a digitized signal. An internal PLL (not shown) generates a clock signal in sync with the digitized signal.

The digital signal processing circuit 507 executes a predetermined demodulating process and address retrieving process to the digitized signal in the address part, at an address reading. At a data reproducing, the digital signal processing circuit 507 executes a predetermined demodulating process and error correcting process to the digitized signal in the data part to generate a reproduction data. In data recording, the digital processing circuit 507 executes a process to add error correction code and a predetermined demodulating process to data to be recorded to generate a modulated data. The digital processing circuit 507 also generates dummy data which is described below.

The recording compensation circuit 508 converts the modulated data into optical modulated data that is composed of a series of pulses, and further controls subtly pulse widths of the optical data to generate a recording pulse signal suitable for forming pits. The CPU 509 controls a whole of the optical disk drive. The host 510 may be composed of a computer hardware (not shown), application software (not shown), and operating system (not shown), and requests recording/reproducing onto/from the optical disk 500.

<Operation of Recording Apparatus>

With reference to FIGS. 3A, 3B and 5, the description is made to operations to reproduce/record data from/onto the optical disk 500. It is noted that the following description is made with an example in which a continuous data recording of one content is started from a sector 307 (that is, block 313) in a track 301 shown in FIG. 3A.

When the host PC 501 provides the CPU 509 with a data recording request (the request is for recording data in the block 313.), the servo circuit 505 moves the optical head 503 to the vicinity of the sector which has an address indicated by the data recording request.

The digital signal processing circuit 507 starts address reading according to the digitized signal which is obtained via the optical head 503 and the reproduction digitizing circuit 506, and reads out the addresses of sectors 303 to 306 to determine the block address of the block 312 and expect the block address of the block 313. Then, dummy data (dummy signal) is recorded at the sector 306 located in front of the block 313 on which data is to be recorded. A pattern suitable for PLL to extract the clock is used as the dummy data. It becomes possible for PLL to extract the clock from the dummy data, by recording the dummy data on the final sector 306 of the block 312 located in front of the block 313 on which data is to be recorded. Thus, a stable operation to generate the clock by PLL can be achieved even though the region for extracting the clock in PLL is eliminated or reduced.

Subsequently, the address of the sector 307 is read and compared with the address expected from the adjacent before block. When the read address matches the expected address, data recording is started from the sector 307. It is noted that the expected address information is information indicating presence or absence of the address region in a predetermined reproduction timing, or information relating to a whole or partial conformity between the respective pit train and the expected pit train. During this operation, the beam control circuit 504 controls the laser beam emitted from the optical head 503 so that the laser beam has a predetermined power level instructed by the CPU 509. After recording on the sector 307, a predetermined data is recorded on the sectors 308 to 310 while addresses are sequentially read.

Next, the description is made to the reproducing operation. Similar to the recording operation, in the reproducing operation, addresses of sectors 303 to 306 are read out, and then the dummy data recorded on the sector 306 is reproduced. The reproduction signal digitizing circuit 506 amplifies and digitizes the reproduction signal from the optical head 503 to generate the digitized signal. During this operation, the internal PLL generates a clock signal synchronized with the digitized signal. While holding the state of extracting the clock, the PLL reads an address of the sector 307, and then reproduces data recorded on the sector 307.

In case that data is recorded from inside to outside of the optical disk 501, the track 301 becomes a track in vicinity of the most inside track in all of the data regions, and no data is recorded inside of the track 301.

Alternatively, as shown in FIG. 6, in case that an area used to record data of the optical disk is divided into a plurality of zones (for example, for ZCLV control), the track 301 is the most inside track of each zone 602, 603 or 604, or a track located in vicinity of the most inside track. No data is recorded inside of the track 301 in each zone. In the optical disk 501 shown in FIG. 6, data area is divided into three zones. A rotational speed of the spindle motor 502 in each zone is different from each other so that the substantially same linear velocity can be obtained in all zones.

<Example of Sector Configuration>

Figure 11:
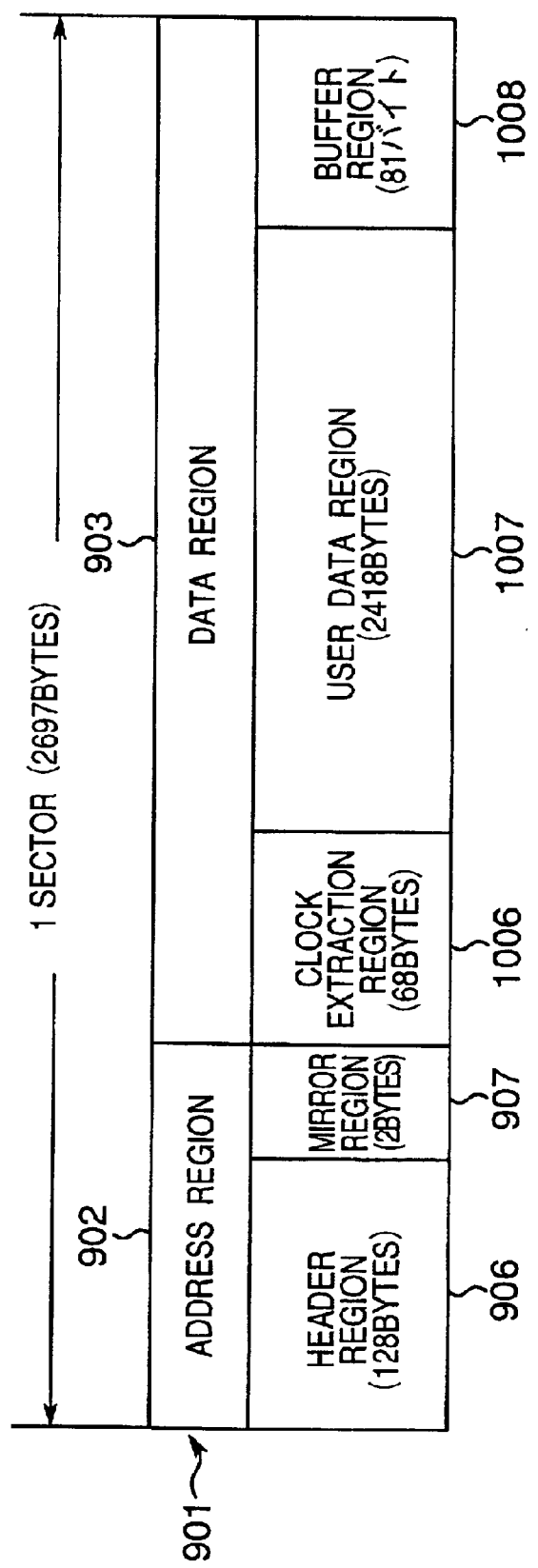
FIG. 11 is an illustrative view of a sector format in the prior art.

FIG. 7 shows a sector configuration of the optical disk according to the invention. The sector 801 includes an address region 802 and a data region 803. The address region 802 has 24 bytes of header region 804 and 12 bytes of mirror region 805. A length of the address region 802 is determined to be smaller than that of the sector in the prior art shown in FIG. 11. In this embodiment, one block address is detected by reproducing four sector address regions, and the dummy pattern for extracting the clock is recorded on the final sector of the block adjacent before the block to record data, and therefore it is possible to extract the clock with a small length of the address region.

The data region 803 includes 13 bytes of front data region 806, 2418 bytes of user data region 807, and 13 bytes of rear data region 808. The front data region 806, the user data region 807, and the rear data region 808 are used ordinary as one to store the user data. As required, the front data region 806 may be used as the clock extraction region 1006 shown in FIG. 11, and the rear data region 808 may be used as the buffer region 1008 shown in FIG. 11. Data lengths of those regions 806 and 808 may preferably set to be smaller than those of regions 1006 and 1008 shown in FIG. 11 respectively to improve the format efficiency.

<Variations of Recording Mode of Dummy Data>

Next, the description is made to variations of recording mode of the dummy data. FIGS. 8A to 8F are views showing different recording modes of the dummy data, respectively. In each recording mode, four sectors compose one block. For example, in the recording mode of FIG. 8A, each block 707, 708, 709 or 710 includes four sectors. In FIGS. 8A to 8F, a hatched portion of the sector means a portion on which the dummy data is recorded. The data D1, D2, D3 and D4 compose one content X, and the data D5, D6, D7 and D8 compose another content Y.

The recording mode shown in FIG. 8A is the recording mode described above with reference to FIGS. 3 and 5. In this recording mode, for recording data D1, D2, D3 and D4 of content X on each sector in the block 708, the dummy data is recorded on the final sector P of the block 707 located in front of the block 708 to be recorded with data. The dummy data is recorded on the whole data region 803 in the sector P. It is noted that, in order to record data in each sector, address information of a sector is first read, and then data is recorded in the sector of which address information has been read.

The recording mode shown in FIG. 8B shows a recording mode in which the dummy data is recorded on a front portion of the data region in addition to the sector before the region to be recorded with the content data. That is, in the data region 803, the front data region 806 is used as the clock extraction region and recorded with the dummy data, the other regions 807 and 808 are recorded with user data. For recording data D1, D2, D3 and D4 on each sector in the block 712, the dummy data is recorded on the final sector P of the block 711 before the block 712 to be recorded with data, and is further recorded on the front portion (front data region 806) of each data region storing data D1, D2, D3 or D4. Recording the dummy data on the front portion of sector storing the data allows an operation of extracting the clock in PLL to be quickly recovered by reproducing the region carrying the dummy data, even though the clock extracting operation in PLL becomes unstable when the optical spot passes through the address region. Also the deterioration of recording layer which proceeds from the front portion of the sector at which a deviation of the incident laser power at iterative data recording is large can be absorbed.

The laser power emitted for recording is five to ten times the laser power emitted for reproduction, and therefore a deviation of the emitted laser powers becomes maximum at an interface of the address region and the data region, resulting in the deterioration of recording layer due to repeat of thermal expansion and shrink. To exclude this deterioration, it is preferable to use a higher power to reproduce the address region during the data recording operation than the power used in the ordinal reproducing operation.

The recording mode shown in FIG. 8C shows a recording mode in which the dummy data is recorded on front and end portions of the data region in addition to the sector before the region to be recorded with the content data. That is, in the data region 803, the front data region 806 is used as the clock extraction region and the rear data region 808 is used as the buffer region. These regions 806 and 808 are used to record the dummy data, and the user data region 807 is used to record the user data. For recording data D1, D2, D3 and D4 to each sector in the block 716, the dummy data is recorded on the final sector P of the block 715 before the block 716 to be recorded with data and is further recorded on the front portion (front data region 806) and end portion (rear data region 808) of each data region storing data D1, D2, D3 or D4.

Recording the dummy data on the front portion of sector storing the data D1 to D4 allows the operation of extracting the clock in PLL to be quickly recovered by reproducing the dummy data region, even though the clock extracting operation in PLL becomes unstable when the optical beam passes through the address region. Also, in iterative data recording, it is possible to absorb the deterioration of recording layer which extends from the front portion of the sector at which a deviation of the incident laser power is large. Further recording the dummy data in end portion of the sector storing the data allows a position shift occurred at data recording to be absorbed. Also, in iterative data recording, it is possible to absorb the deterioration of recording layer which extends from the front portion of the sector at which a deviation of the incident laser power is large.

The recording mode shown in FIG. 8D shows a recording mode in which data recording is suspended in the middle of the block. When recording data D1, D2, D3 and D4 on each sector in the block 720, the dummy data is recorded on the final sector P1 of the block 719 before the block 720 to be recorded with the data. Subsequently the data D1 and D2 are recorded. Then, when the address of the block 720 can not be detected due to a certain cause and thus the data recording is suspended, the address of the following block is detected. When the address of the block (here, block 721) is detected, the final sector P2 of the block 721 is recorded with the dummy data, and subsequently each sector of the block 722 is recorded with data D1, D2, D3 and D4.

As described above, when data recording is suspended due to a certain cause and then re-started, recording the dummy data in the sector in front of the sector from which data recording is re-started. Thus, the clock extracting operation in PLL can be quickly recovered by reproducing the dummy data, even though the clock extracting operation in PLL becomes temporally unstable due to defects produced on the manufacture.

The recording mode shown in FIG. 8E is a mode for recording a plurality of contents. Here, an example for recording the content X including data D1, D2, D3 and D4, and the content Y including data D5, D6, D7 and D8.

Similar to the recording mode shown in FIG. 8A, the dummy data is recorded on the final sector P of the block 723 before the block 724 to be recorded with the data D1 to D4 of the content X, and subsequently data D1, D2, D3 or D4 is recorded on the respective sector of the block 724. Data D5, D6, D7 and D8 as the content Y is recorded on the respective sector of the block 725 following the block 724 on which data D1, D2, D3 and D4 are recorded. When data following the data D5 is reproduced, an operation of extracting the clock in PLL is performed while dummy data in the block 723 or the block 724 is reproduced, and then the following data is reproduced while a state of the clock extracting operation in PLL is being held.

In this recording mode, when new data is recorded in connection with the sector with data which has not been recorded yet, the dummy data is first recorded, while when new data is recorded in connection with the data which has been already recorded, the dummy data is not recorded. This can increase storage capacity of user data.

FIG. 8F is a view explaining another recording mode for recording a plurality of contents. In the recording mode shown in FIG. 8F, the final sector P1 of the block 727 is recorded with the dummy data and then each sector of the block 728 is recorded with the data D1, D2, D3 and D4 of the content X. Subsequently, when the content Y is recorded, the dummy data is recorded on the final sector P2 of the data block 729 following the block 728 carrying the data D1 to D4 of the content X, and then the data D5, D6, D7 and D8 is recorded on each sector of the block 730.

In this recording mode, when data of new content Y is recorded in connection with the data which has been already recorded, the dummy data is recorded on the sector adjacent before the sector from which data recording of the new content (Y) data is started. Thus, a stable clock extracting operation in PLL can be achieved by reproducing the dummy data, even in the case that data recording state or modulation method is largely different, that a zone is changed, or that the linear velocity or recording density is largely different, between two contents X and Y.

It is noted that the recording mode shown in FIG. 8E and 8F may be switched and used for each disk or data. In this case, information of switching recording mode for each data is stored to a specific region of the disk (for example, a region capable of recording in the control track 601 in FIG. 6), or a recording apparatus.

At the border sectors between two different contents, excluding the case that the recording statuses are largely different, the case that the modulation methods are different, and the case that the linear velocity or recording density is different, the recording mode of FIG. 8E has a high possibility of reproduction even though it takes a long rotational waiting time, by extracting the clock in PLL from a sector which is in far front of the target sector or by repeating the above described steps a plurality of times. Accordingly, it is suitable for the case that continuous data recording in one location is possible, or the case that a memory can cope with a problem relating to the long rotational waiting time even though data is recorded on a plurality of regions.

On the contrary, in the recording method shown in FIG. 8F, data that is used to extract the clock in PLL is recorded on the sector adjacent before the sector from which data recording of a new data is started. This allows data to be reproduced more surely in a short rotational waiting time. This is suitable for the case that data is recorded distributively on a plurality of regions or the case that the memory does not have a enough capacity to cope with the long rotational waiting time. It is noted that the memory is provided with the host PC 510 shown in FIG. 5 and stores temporally the data from the digital processing circuit 507.

Figure 10:
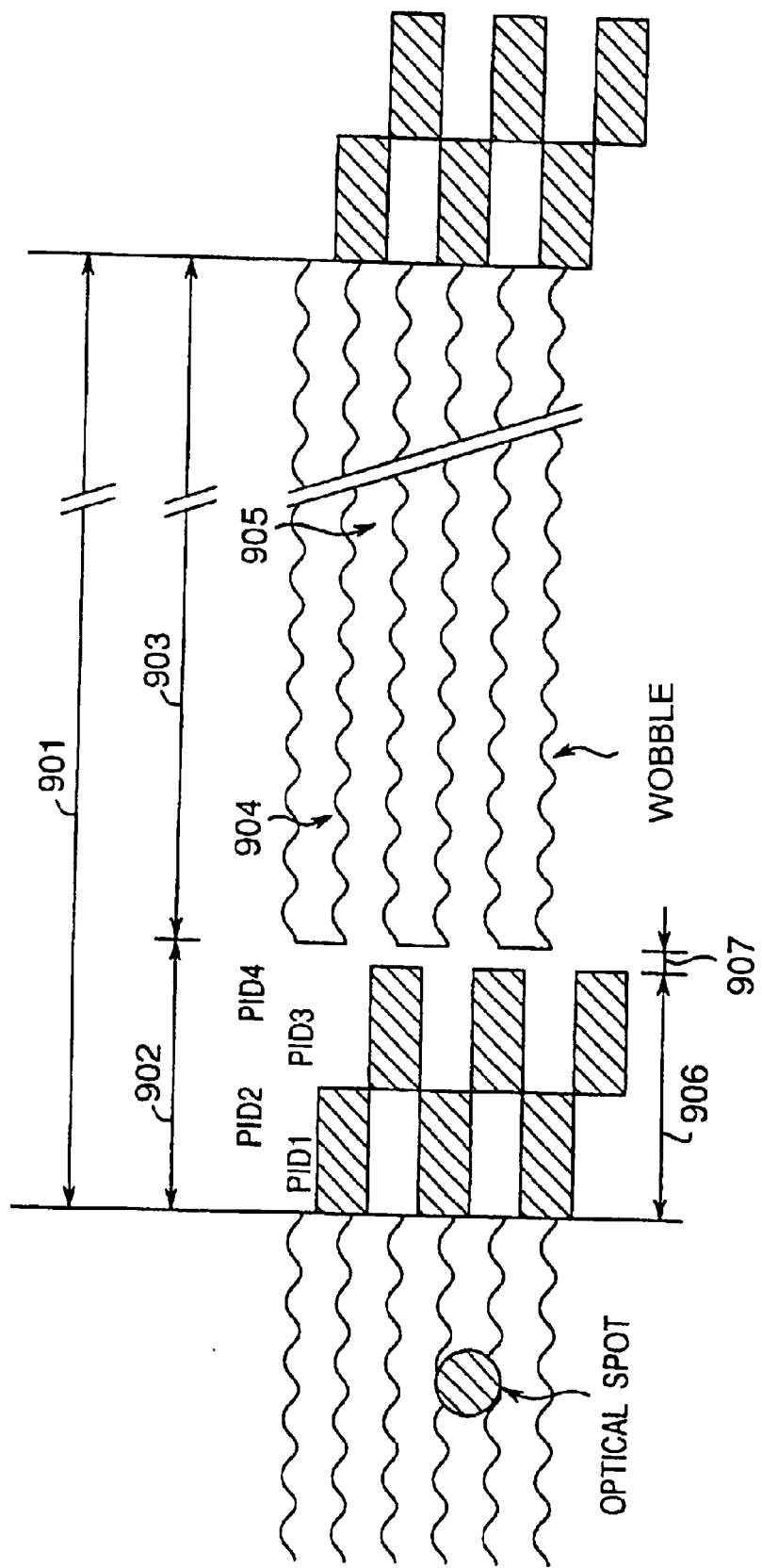
FIG. 10 is an illustrative view of a physical sector structure on a track of an optical disk in the prior art.

The format efficiency is determined below for the recording mode in which the dummy data is recorded on both front and end portions of data region as shown in FIG. 8C. Referring to FIG. 7, for recording 2418 bytes of data on the user data region 803 of the sector 801, required are 24 bytes of header region 804, 12 bytes of mirror region 805, 13 bytes of front data region 806, and 13 bytes of rear data region 808. Accordingly, 2480 bytes length in total is needed for a sector. The data stored in the user data region includes a portion for error correction, and therefore a sector needs 2480 bytes length to store 2048 bytes of data. At that time, a utilization ratio of the disk (format efficiency) for recording signal on the disk is 82.5% (=2048/2480). This means that the format efficiency is largely improved compared to the prior art (75.9%) shown in FIG. 10. Recording not dummy data but user data to the front data region 806 and the rear data region 808 as shown in FIGS. 8A and 8B results in more improvement of the format efficiency.

As described above, recording the dummy data on the sector adjacent before the sector to be recorded (reproduced) with data allows the length of the region (corresponding to front data region 806 and rear data region 808) for extracting the clock in PLL in the sector to be recorded with data to be eliminated or reduced drastically. That is, recording the dummy data on the sector (P, P1) adjacent before the sector from which data is reproduced can provide a stable operation of extracting the clock in PLL even though the length of the region for extracting the clock is eliminated or reduced. It is noted that although in FIG. 7 the mirror region 805 is allocated after the header region 804, the mirror region 805 may be allocated before the header region 804. By allocating it before the header region 804, the position of the header region 804 can be easily specified. Particularly, address reading can be started rapidly at start-up or after jump from a position on a different radial.

In this embodiment, the dummy data is recorded on the sector adjacent before the sector from which data reproduction is started. However, the dummy data may be recorded on a plurality of sectors including the adjacent before sector and sectors located before the adjacent before sector, if a stable operation of extracting the clock in PLL can be achieved to the following sectors to be reproduced. This allows a margin for extracting the clock in PLL to be extended.

Similarly, in this embodiment the dummy data is recorded on the whole data region in the sector adjacent before the sector from which data reproduction is started. However, the dummy data may be recorded on a portion of the sector including a end portion, for example, a latter half portion, if a stable operation of extracting the clock in PLL can be achieved to the following sectors to be reproduced.

The dummy data may be a pattern capable of extracting the clock, and more preferably be a pattern with a single frequency. By using the single frequency pattern, a stabler operation of extracting the clock in PLL can be achieved. Further the dummy data may be a pattern including iteration of a predetermined pattern.

Second Embodiment.
<Recording Mode of Dummy Data with No Address Region>

In the above embodiment, the description has been made to the case that the address region carrying address information is provided between the data regions. However the address region may not be provided between the data regions when the address information can be detected without the address region, for example, when address information is superimposed on the wobble of the track. That is, in the format shown in FIG. 7, one sector may include only the data region 803.

The recording mode of the dummy data when the address region is not provided is described below in detail with reference to FIGS. 9A to 9C.

Figure 9A:
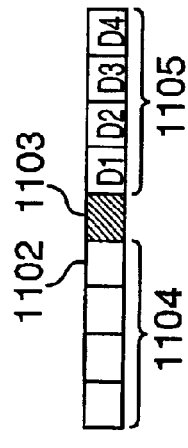
FIGS. 9A to 9C are illustrative views showing recording modes of recording the dummy data in case that the address region is not provided (Second Embodiment)
Figure 9B:
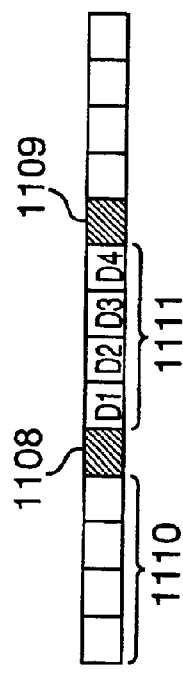
Figure 9C:
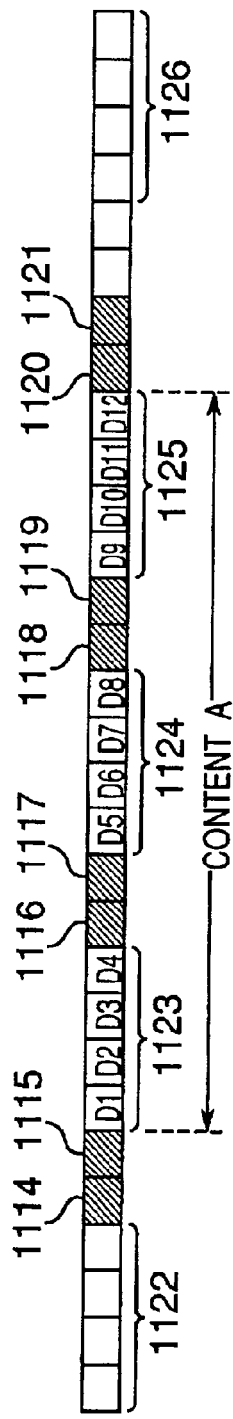

FIGS. 9A to 9C show different recording modes of the dummy data, respectively. For example, in FIG. 9A, the block 1104 or 1105 is composed of four sectors. In FIGS. 9A to 9C, hatched portion indicates a region to which the dummy data is recorded.

In the recording mode of FIG. 9A, the dummy data is recorded on a gap region 1103 between the blocks 1104 and 1105 before recording the data D1 to D4 to each sector in the block 1105. The length of the gap region 1103 may preferably be shorter than that of the sector 1102. Making the region 1103 shorter than the sector 1102 allows the data region to be larger, resulting in a mass storage optical disk.

In the recording mode of FIG. 9B, the dummy data is recorded on a gap region 1108 between the blocks 1110 and 1111 before recording the data D1 to D4 in each sector of the block 1111. Then data D1 to D4 are recorded, and subsequently the dummy data is recorded on the region 1109 adjacent after the block 1111. The dummy data recorded on the region 1108 and the dummy data recorded the region 1109 may be different in data pattern or data length. It is possible to determine a leading of the block by reproducing the dummy data with different data pattern or data length. Regarding the dummy data recorded on the regions 1108 and 1109, when the respective dummy data includes a plurality of patterns each having a different data pattern, the respective dummy data may have a common pattern portion of which data pattern or data length is in common with those dummy data. The common pattern portion allows a configuration of an apparatus for recognizing a pattern to be simple.

Next, the description is made to the recording mode of FIG. 9C, in which data D1 to D12 compose a content.

The dummy data is recorded on a gap region 1114 between the blocks 1122 and 1123 before recording the data D1 to D4 to each sector on the block 1123. Then, the dummy data is recorded on the gap region 1116 between the blocks 1123 and 1124 after recording the data D1 to D4 on the block 1123.

Next, for recording data D5 to D8 on each sector in the block 1124, prior to a record of data D5 to D8, the dummy data is recorded on the gap region 1117 between the blocks 1123 and 1124. Then, the dummy data is also recorded on the gap region 1118 between the blocks 1124 and 1125 after recording the data D5 to D8.

Similarly, the dummy data is recorded on a gap region 1119 between the blocks 1124 and 1125 before recording the data D9, D10, D11 and D12 in each sector of the block 1125. Then, the dummy data is also recorded on each of the region 1120 and 1121 between the blocks 1125 and 1116 after recording the data D9, D10, D11 and D12.

Patterns or lengths of data recorded on the region 1115, 1117 and 1119 are the same, and patterns or lengths of data recorded on the region 1116, 1118 and 1120 are the same. As a matter of convenience, in the following description dummy data is referred to with the same numeral reference as that indicating the gap region which stores the dummy data.

If each data in a first group including the dummy data 1115, 1117 and 1119 can be distinguished from each data in a second group including the dummy data 1116, 1118 and 1120, length or start position of each dummy data can be varied randomly. For example, length or start position of each dummy data 1115, 1117 or 1119 may be varied randomly by a several times of the reference clock to be recorded. Thus, when a plurality of recordings are performed on the same region, a region highly heated up may be changed subtly at each recording and therefore deterioration of the recording layer can be reduced.

The dummy data 1114 recorded before the leading block 1123 of the content A may be longer than the dummy data 1115, 1117 or 1119 recorded adjacent before each block in the content A. That is, when content A includes data D1 to D12, the dummy data 1114 is recorded before the dummy data 1115 and is set to be different from the other dummy data in data length and data pattern. This allows the start position of the content A to be recognized by reproducing the dummy data 1114.

The dummy data 1121 recorded after the final block 1125 of the content A may be longer than the dummy data 1116, 1118 or 1120 recorded adjacent after each block in the content A. That is, when content A includes data D1 to D12, the dummy data 1121 is recorded after the dummy data 1120 recorded after the final data D12 of the content A and is set to be different from the other dummy data in data length and data pattern. This allows the end position of the content A to be recognized by reproducing the dummy data 1121.

According to this embodiment, the dummy data exists in a region between the block 1125 and the block 1126. This enables a quality deterioration of the data D12 recorded on the block 1125 to be suppressed even though the recording power varies when the recording of the next content is started from the block 1126.

As described above, the dummy data is recorded before the recording unit (block) containing the error correction codes, while in the recording unit (block) containing the error correction codes, no dummy data or a relatively small length of the dummy data is recorded. This can result in improvement of the format efficiency and a stable operation of extracting the clock in PLL.

It is noted that the concept of this embodiment can be applied to the fist embodiment in which an address region is provided between data regions by reading a gap region as a sector. Further it is noted that the concept of the first embodiment of the invention described with reference to FIG. 7 can also be applied to this embodiment.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The present disclosure relates to subject matter contained in Japanese Patent Application No. 2001-047855, filed on Feb. 23, 2001, which is expressly incorporated herein by reference in its entirety.

What is claimed is:

1. A method of recording data onto an optical disk having a plurality of sectors, each sector having a data region to be recorded with data, the data being recorded in units of blocks, each block being a data unit which includes a predetermined number of sectors and to which error correction is applied, the method comprising:

in recording data related to a content by dividing and recording the data on a plurality of continuous sectors, recording dummy data on a region adjacent before to a first sector contained in each block and a region adjacent to a last sector contained in each block; and recording an end dummy data on a region adjacent to the dummy data recorded on the region adjacent to the last sector contained in a final block included in the content;

wherein the end dummy data has a different length from the dummy data recorded on the regions adjacent to the first and last sectors contained in each block included in the content.

2. The method according to claim 1, wherein the dummy data is used for extracting a clock for data reproduction.

3. An apparatus for recording data onto an optical disk having a plurality of sectors, each sector having a data region to be recorded with data, the data recorded in units of blocks, each block being a data unit which includes a predetermined number of sectors and to which error correction is applied, the apparatus comprising:
  a recording unit that optically records the data to the optical disk, and a controller that controls the recording operation of the recording unit,
  wherein, in recording data related to a content by dividing and recording the data on a plurality of continuous sectors, the controller controls the recording unit such that:
  the dummy data is recorded on a region adjacent to a first sector contained in each block and a region adjacent to a last sector contained in each block; and
  an end dummy data is recorded on a region adjacent to the dummy data recorded on the region adjacent to the last sector contained in a final block included in the content;
  wherein the end dummy data has a different length from the dummy data recorded on the regions adjacent to the first and last sectors contained in each block included in the content.

4. The apparatus according to claim 3, wherein the dummy data is used for extracting a clock for data reproduction.

5. An optical disk on which data is recorded optically, the disk comprising: a plurality of sectors, each sector having a data region to be recorded with data, the data being recorded in units of blocks, each block being a data unit which includes a predetermined number of sectors and to which error correction is applied,
  wherein in recording data related to a content by dividing and recording the data in a plurality of sectors,
  the dummy data is recorded on a region adjacent to a first sector contained in each block and a region adjacent to a last sector contained in each block; and
  an end dummy data is recorded on a region adjacent to the dummy data recorded on the region adjacent to the last sector contained in a final block included in the content;
  wherein the end dummy data has a different length from the dummy data recorded on the regions adjacent to the first and last sectors contained in each block included in the content.

6. The optical disk according to claim 5, wherein the dummy data is used for extracting a clock for data reproduction.

* * * * *